United States Patent [19]

Sacks

[11] Patent Number: 5,739,435
[45] Date of Patent: Apr. 14, 1998

[54] TWO-STAGE STRAIN-SENSING DEVICE AND METHOD

[75] Inventor: Ivor Selwyn Sacks, Chevy Chase, Md.

[73] Assignee: Carnegie Institution of Washington, Washington, D.C.

[21] Appl. No.: 733,012

[22] Filed: Oct. 16, 1996

Related U.S. Application Data

[60] Provisional application No. 60/007,109, Oct. 31, 1995.
[51] Int. Cl.[6] .............................. G01B 5/00; G01B 7/16; G01L 1/00; G01N 33/24
[52] U.S. Cl. .................................................. 73/784; 73/783
[58] Field of Search .............................. 73/760, 781, 784, 73/783

[56] References Cited

U.S. PATENT DOCUMENTS

| | | | |
|---|---|---|---|
| 3,030,037 | 4/1962 | Raetz | 106/89 |
| 3,155,526 | 11/1964 | Klein | 106/89 |
| 3,251,701 | 5/1966 | Klein | 106/89 |
| 3,635,076 | 1/1972 | Sacks | 73/781 |
| 4,594,899 | 6/1986 | Henke et al. | 73/784 |
| 5,517,854 | 5/1996 | Plumb et al. | 73/784 |

*Primary Examiner*—Elizabeth L. Dougherty
*Assistant Examiner*—Max H. Noori
*Attorney, Agent, or Firm*—Cushman Darby & Cushman Intellectual Property Group of Pillsbury Madison & Sutro LLP

[57] ABSTRACT

A device for detecting deformations in solids includes a casing constructed and arranged to be insertable in a solid. The casing has walls defining a substantially closed container. The container has an inner dividing wall separating the container into an upper enclosed section and a lower enclosed section. A fluid substantially fills the lower enclosed section and is in fluid communication with the interior walls of the lower enclosed section. A first strain-sensing system is in fluid communication with the lower enclosed section of the container such that deformation of the walls causing pressure changes in the fluid are detected by the first strain-sensing system. A second strain-sensing system is disposed in the upper enclosed section. The upper enclosed section is at least partially filled with fluid. A valve fluidly couples the second strain-sensing system to the lower enclosed section. The valve is operatively associated with the first strain-sensing system and is normally closed, preventing fluid in the lower section from communicating with the second strain-sensing system. The valve is constructed and arranged to open in response to a signal sent from the first strain-sensing system when the first strain-sensing system reaches an operating limit of strain measurement, thereby protecting the first strain-sensing system from being damaged from strains exceeding the operating limit thereof. The second strain-sensing system is constructed and arranged to measure the excessive strains.

10 Claims, 1 Drawing Sheet

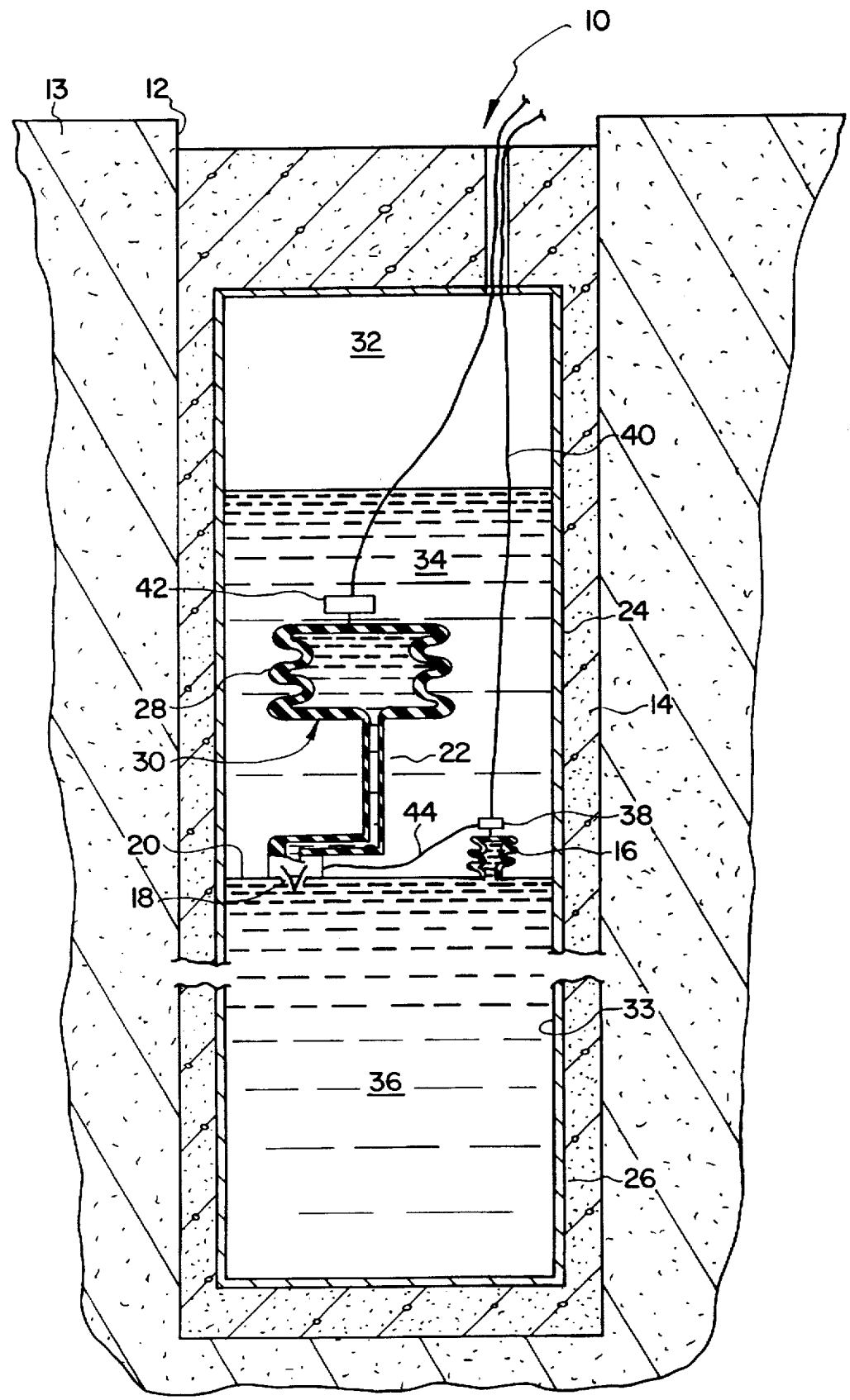

TWO-STAGE STRAIN-SENSING DEVICE AND METHOD

This application is based on provisional application Ser. No. 60/007,109 filed Oct. 31, 1995.

This invention relates generally to devices for detecting strains and deformations in solids, and more particularly, to devices adapted to detect strains in the earth.

BACKGROUND OF THE INVENTION

The use of borehole strainmeters and systems to measure movement of subterranean rock formations is known. Many different strainmeters and systems have been devised for commercial use, but most have defects and limitations in operation.

One known borehole strainmeter comprises a resilient metal tube prestressed into a borehole with an expansive grout so that the tube follows the deformation of the rock exactly. The deformation is amplified by hydraulic means and drives a small, thin-walled bellows, which in turn drives an electronic transducer. All power and signals reach the earth's surface through an electric cable. There are a number of these devices in use worldwide.

Many of these instruments have been installed in earthquake-prone areas in order to study strain build up before earthquakes, as well as near-field deformation and its development. In order to clearly detect strains as small as $10^{-12}$, it is necessary to limit the maximum instantaneous strain measurement to approximately $10^{-5}$, because of the limited travel of the electronic transducer, a low noise LVDT (Linear Variable Differential Transformer). The range of the mechanical and hydraulic parts of the instrument is much greater, more than $10^{-3}$, which could follow any conceivable earthquake strain. The transducer (LVDT) and bellows are protected from over-pressure, due to large nearby events, by a valve which is automatically opened to release pressure in the sensing volume. If the valve opens during an earthquake, the strain-step information is lost. This has already happened a few times to the nearest instrument.

Accordingly, there exists a need to provide a strain-sensing system that ensures that when a transient strain amplitude forces a valve open, strain-step information is not lost.

SUMMARY OF THE INVENTION

An object of this invention is to fulfill the need referred to above. This object is achieved by providing a device for detecting deformations in solids. The device includes a casing constructed and arranged to be insertable in a solid. The casing has walls defining a substantially closed container. The container has an inner dividing wall separating the container into an upper enclosed section and a lower enclosed section. A fluid substantially fills the lower enclosed section and is in fluid communication with the interior walls of the lower enclosed section. A first strain-sensing system is in fluid communication with the lower enclosed section of the container such that deformation of the walls causing pressure changes in the fluid are detected by the first strain-sensing system. A second strain-sensing system is disposed in the upper enclosed section. The upper enclosed section is only partially filled with fluid. A valve fluidly couples the second strain-sensing system to the lower enclosed section. The valve is operatively associated with the first strain-sensing system and is normally closed, preventing fluid in the lower section from communicating with the second strain-sensing system. The valve is constructed and arranged to open in response to a signal sent from the first strain-sensing system when the first strain-sensing system reaches an operating limit of strain measurement, thereby protecting the first strain-sensing system from being damaged from strains exceeding the operating limit thereof. The second strain-sensing system is constructed and arranged to measure the excessive strains.

The strainmeter device consists essentially of a fluid-filled resilient tube prestressed into a borehole by means of an expansive grout. As the tube is deformed by stresses in the surrounding medium, its volume changes slightly and fluid is expelled into a small diameter, thin-walled bellows. The length of the bellows is changed by this expelled fluid and this length change is monitored by a linear differential transformer, or other such well known means.

In accordance with another object of the invention, a method of detecting deformations in solids is provided using the above-mentioned device. The method includes inserting the casing into a solid in such a manner that deformations of solid may be transmitted to walls of the casing. Strains in the solid are determined by detecting deformations of the walls of the container with the first strain-sensing system by permitting fluid in the lower enclosed section to communicate with the first strain-sensing system as the walls of the container deform. The first strain-sensing system is monitored to ensure that the first strain-sensing system does not exceed an operating limit of strain measurement due to excessive strains in the solid. The valve is opened when the operating limit of the first strain-sensing system is substantially reached to fluidly communicate the lower enclosed section with the second strain-sensing system, thereby preventing damage to the first strain-sensing system. The excessive strains are measured by the second strain-sensing system.

Other objects, features and characteristics of the present invention, as well as the methods of operation and functions of the related elements of the structure, and the combination of the parts and economics of manufacture, will become more apparent upon consideration of the following detailed description and appended claims with reference to the accompanying drawings, all of which form a part of this specification.

BRIEF DESCRIPTION OF THE DRAWING

The FIGURE show schematic of the invention sensing unit.

DETAILED DESCRIPTION OF THE INVENTION

A better understanding of the invention will be obtained upon reference to the FIGURE which is a schematic sectional drawing of a sensing unit within a borehole in a subterranean formation.

Referring to the FIGURE, the device, generally indicated at 10, comprises a casing or container 11 disposed in a borehole 12 in the earth 13 and intimately coupled with the surrounding earth structure by coupling structure in the form of a cement packing 14. The packing 14 comprises an expansive cement such as, for example, one of the calcium aluminosulfate containing expansive cements described in U.S. Pat. No. 3,155,526, U.S. Pat. No. 3,251,701 and U.S. Pat. No. 3,030,037, the contents of which are hereby incorporated hereinto by reference.

The casing 11 consists of a steel tube prestressed into the rock, so that it faithfully follows minute deformation in the rock. The casing 11 comprises a lower enclosed section 26 filled with sensing fluid 36 which is in open communication with a small bellows 16. A normally closed electrically operated valve 18 is located in wall 20 between the upper section 24 and lower section 26. Upper section 24 is partially filled with fluid 34 and an upper layer of gas 32. The gas space above the fluid level allows bellows 16 and 28 to deform with little back pressure.

The sensitivity of the device 10 is proportional to the ratio of the sensing volume to the bellows 16 area. Therefore, to obtain the highest sensitivity which is desirable for some studies, bellow 16 has a small area. In general the range of such devices is from $10^{-12}$ to about $3 \times 10^{-6}$. Beyond that range, the bellows becomes over-extended. However, strains due to nearby earthquakes can exceed $10^{-4}$. Conventionally, in order to protect these instruments from damage under these conditions, an electrically operated valve is provided which opens to an unpressurized reservoir when the small bellows 16 travel reaches its safe operating limit. Once the valve has opened and fluid flows out of the sensing volume, strain information is lost. This information, however, is extremely valuable for studying the earthquake process.

In accordance with the invention, the electrically operated valve 18 is provided in fluid communication with tube 22 which is connected to bellows 28. A normally closed valve 30 is positioned in a lower portion of bellows 28. Valve 30 is used in the fluid filling stage and for shipping the device.

In the device 10, once the valve 18 opens, fluid exiting the opened valve 18 is introduced into the second, much larger diameter, bellows 28, as will be explained more fully below. The diameter and volume of the secondary bellows 28 is large enough that strains greater than $10^{-4}$ can be accommodated and measured.

The fluid 34 and 36 used in sections 24 and 26 can be any fluid compatible with the structure of the device as described in U.S. Pat. No. 3,635,076, which is incorporated herein by reference thereto.

Preferably, silicon oil has been found to be suitable for the purpose of the invention although chloroform-saturated water, and other fluids can be used. The gas 32 used can be any gas compatible with the structure of the device. Suitable gases include argon, nitrogen and the like.

In actual operation, as the strain in the surrounding structure changes, the borehole 12 will be distorted and the wall 33 of casing 11 will follow the hole deformation. As the casing wall is deformed, the volume of sensing fluid 36 changes and the pressure in the fluid therein thereby changes, which pressure change is sensed by expansion of bellows 16. Bellows 16 preferably comprises a sylphon bellows which is coupled to a linear variable differential transformer 38 or other suitable measuring device. The transformer (LVDT) 38 provides an electrical indication in the change in length of the bellows 16 in a manner known in the art. The bellows 16 and transformer 38 define a strain-sensing system. The electrical signals generated representative of strain can be transmitted to the surface through suitable wiring 40.

In normal operation, valve 18 is closed and any volume changes in the sensing fluid 36 causes extension (or compression) of the bellows 16. The motion of bellows 16 is measured by the LVDT 38 or similar device. If the deformation of the hole 12 is so great that bellows 16 is extended (or compressed) to its operating limit as detected by the attached LVDT 38, valve 18 is opened by electrical signal via wire 44, derived from LVDT 38 on bellows 16.

Fluid will flow through the valve 18 into large diameter bellows 28, whose extension (or compression) is measured by a second LVDT 42. Therefore, excessive strains can be measured using bellows 28 and its linear variable differential transformer (LVDT) 42. Thus, the bellows 28 and LVDT 42 define a second strain sensing system.

After the large deformation episode passes, e.g. after the earthquake-induced deformations have ceased, valve 18 is closed and the device 10 reverts to its high sensitivity state.

Although specifically described herein as applied to earth deformation sensing devices, it should be understood that device in accordance with the invention can find utility in sensing strains in any solid structure such as dams, walls or the like, if so desired.

It can be seen that the objects of the invention have been effectively accomplished. The provision of the large volume second bellows 28 ensures that even the largest expected strain will not drive LVDT 42 beyond its operating limit.

While the invention has been described in connection with what is presently considered to be the most practical and preferred embodiment, it is understood that the invention is not limited to the disclosed embodiment but, on the contrary, is intended to cover various modifications and equivalent arrangements included within the spirit and scope of the appended claims.

What is claimed is:

1. A device for detecting strains and deformations in solids comprising
    a casing constructed and arranged to be insertable in a solid, said casing having walls defining a substantially closed container, said container having an inner dividing wall separating the container into an upper enclosed section and a lower enclosed section;
    a fluid substantially filling the lower enclosed section and in fluid communication with the interior walls of the lower enclosed section, said fluid at least partially filling said upper enclosed section;
    a first strain-sensing system in fluid communication with said lower enclosed section of the container such that deformation of said walls causing volume changes in the fluid are detected by said first strain sensing system;
    a second strain-sensing system having a larger range and lower sensitivity than the first strain-sensing system disposed in said upper enclosed section, said second strain-sensing system being operable during solids deformations exceeding strain measuring limit of the first strain sensing system; and
    a valve fluidly coupling said second strain-sensing system to said lower enclosed section, said valve being operatively associated with said first strain-sensing system and being normally closed, preventing fluid in said lower section from communicating with said second strain-sensing system, said valve being constructed and arranged to open in response to a signal sent from the first strain-sensing system when said first strain-sensing system reaches an operating limit of strain measurement and to allow fluid flow from the lower enclosed section into the second strain-sensing system, thereby protecting the first strain-sensing system from being damaged from strains exceeding the operating limit thereof, said second strain-sensing system being constructed and arranged to measure strains in excess of the operating limit of the first strain-sensing system.

2. A device in accordance with claim 1, further comprising coupling structure constructed and arranged to rigidly couple the walls of the container to the solid into which the casing is inserted to transmit deformation of the solid to the walls of the container and to produce pressure pulses in the fluid in the lower enclosed section of the container.

3. A device in accordance with claim 2, wherein said coupling structure comprises a packing cement.

4. A device in accordance with claim 1, wherein said fluid is one of silicon oil and chloroform-saturated water.

5. A device in accordance with claim 1, wherein said casing is a steel tube.

6. A device in accordance with claim 1, wherein the first and second sensing systems each comprise a bellows communicating with the fluid in the lower enclosed section and a differential transformer coupled to the associated bellows and operable thereby.

7. A device in accordance with claim 6, wherein the bellows of the second sensing system has an effective area sufficient to ensure that the largest expected strain will not drive the differential transformer associated therewith beyond an operating limit thereof.

8. A device according to claim 6, wherein said valve in an electrically operated valve and an electrical signal actuates opening of the valve to allow flow of fluid from the lower enclosed section into the bellows of the second sensing system in response to movement of the bellows of the first sensing system to the operating limit thereof as detected by the differential transformer thereof.

9. A device according to claim 6, wherein the bellows of the first and second sensing system are each covered by the fluid in the upper enclosed section and above the fluid there is a gas space which allows each of the bellows to deform with little back pressure.

10. A method of detecting strains and deformations in solids using a sensing device, the sensing device including a casing having walls defining a substantially closed container, the container having an inner dividing wall separating the container into an upper enclosed section and a lower enclosed section; a fluid substantially filling the lower enclosed section and in fluid communication with the interior walls of the lower enclosed section, the fluid at least partially filling the upper enclosed section; a first strain-sensing system in fluid communication with the lower enclosed section of the container; a second strain-sensing system having a larger range and lower sensitivity than the first strain-sensing system disposed in the upper enclosed section; and a valve fluidly coupling the second strain-sensing system to the lower enclosed section, the valve being operatively associated with the first strain-sensing system and being normally closed, preventing fluid in the lower enclosed section from communicating with the second strain-sensing system, the method including

- inserting the casing into a solid in such a manner that deformations of solid may be transmitted to walls of the casing;

- determining strains in the solid by detecting deformations of the walls of the container with the first strain-sensing system by permitting fluid in the lower enclosed section to communicate with the first strain-sensing system as the walls of the container deform,

- monitoring the first strain-sensing system to ensure that the first strain-sensing system does not exceed an operating limit of strain measurement due to excessive strains in the solid,

- opening the valve when the operating limit of the first strain-sensing system is substantially reached to fluidly communicate the lower enclosed section with the second strain-sensing system, and to allow fluid flow from the lower enclosed section into the second strain-sensing system thereby preventing damage to the first strain-sensing system, and

- detecting strains in excess of the operating limit of the first strain-system with the second strain-sensing system, thereby ensuring that when transient strain amplitude exceeds the operating limit of the first strain-sensing system and the valve is opened, strain-step information is not lost.

* * * * *